H. A. PEDRICK.
TAPER BORING MACHINE.
APPLICATION FILED OCT. 27, 1920.
1,436,522.
Patented Nov. 21, 1922.
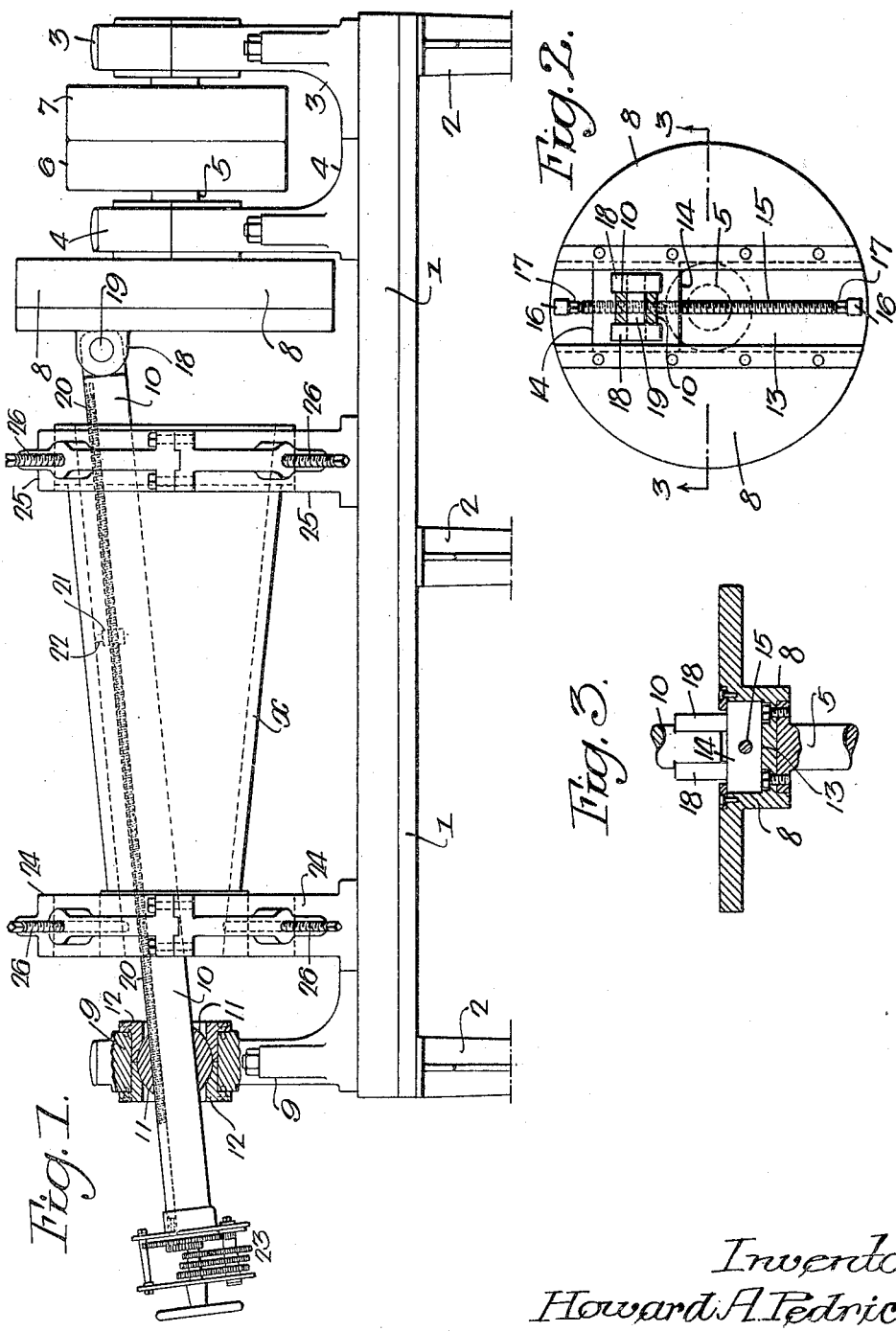
Inventor
Howard A. Pedrick,
by his Attorneys
Howson & Howson Patented Nov. 21, 1922.

1,436,522

UNITED STATES PATENT OFFICE.

HOWARD A. PEDRICK, OF BALA, PENNSYLVANIA, ASSIGNOR TO HOWARD A. PEDRICK AND ALBERT D. PEDRICK, COPARTNERS TRADING AS PEDRICK TOOL AND MACHINE COMPANY.

TAPER-BORING MACHINE.

Application filed October 27, 1920. Serial No. 419,399.

*To all whom it may concern:*

Be it known that I, HOWARD A. PEDRICK, a citizen of the United States, residing in Bala, Montgomery County, Pennsylvania, have invented Taper-Boring Machines, of which the following is a specification.

One object of this invention is to provide a novel mechanism for conically boring or turning the inside surface of a tubular structure, which shall be simple and substantial, as well as convenient to operate; the invention more especially contemplating a machine for cutting out a tapering cavity, which may be readily and quickly adjusted to vary the angle of the board or turned surface to the longitudinal axis of the structure operated on.

These objects and other advantageous ends I attain as hereinafter set forth, reference being had to the accompanying drawings, in which, Fig. 1 is a side elevation, partly in vertical section through one of the bearings, illustrating a machine constructed in accordance with my invention;

Fig. 2 is an elevation of the front of the face plate of the machine shown in Fig. 1 with the boring bar in section and illustrating the means for adjusting the angle of the line of cut of the tool; and Fig. 3 is a horizontal section on the line 3—3, Fig. 2.

In the above drawings, 1 represents the elongated bed of the machine which may be supported upon suitable legs 2 and which has fixed to it bearings 3 and 4 for a shaft 5 carrying fast and loose pulleys 6 and 7, together with a face plate 8. The two bearings 3 and 4 are mounted adjacent one end of the bed and at the opposite end thereof is a third bearing 9 whose construction is such as to so support a boring bar 10 as to permit of its having a limited universal movement. For this purpose said bearing includes a spherical element 11 having through it a passage for the bar 10 and rotatably held in the bearing structure by a pair of flanged bushings 12.

The face plate 8 is formed with a central, transversely extending and undercut guideway 13 for the reception of a slidable block 14 having through it a passage threaded for the reception of a screw 15 rotatably supported by a pair of posts 16. Adjacent each of its ends this screw has polygonal portions 17 for the reception of a wrench, whereby it may be turned for causing movement of the block 14 to any extent on either side of the axis of revolution of the face plate.

Projecting from the front face of the block 14 is a pair of parallel lugs 18, between which one end of the boring bar 10 is pivoted by means of a pin 19. The boring bar itself is longitudinally slotted for the reception of a feed screw 20 on which is mounted a tool holder 21 held from rotating by the walls of said slot and carrying a cutting tool 22. For rotating the feed screw 20 and thereby causing movement of the holder 21 and its tool longitudinally of the boring bar, I provide any suitable form of feed gearing 23 such for example as that described and claimed in my U. S. Patent No. 1,230,020, dated June 12, 1917.

Also mounted on the bed 1 between the face plate 8 and the bearing 9 are a pair of annular chucks 24 and 25 for rigidly holding the more or less enlongated structure $x$ to be internally bored so that its axis is coincident with the center line of the shaft 5. These chucks have clamping screws 26 whereby said structure $x$ may be rigidly held in place and under conditions of use the rotation of the face plate 8 by power applied to the fast pulley 6 will cause the boring bar 10 to describe a conical surface whose axis is coincident with that of the shaft 5 and of the face plate 8 and the radius of whose base is dependent upon the amount of displacement of the block 14—hence of the end of the boring bar attached thereto, from the center of said plate.

The cutting edge of the tool 22 is thus caused to describe a circle whose diameter depends upon its distance from the apex of the surface described by the boring bar, so that after the crank formed by the face plate and the block 14 has been adjusted by movement of the latter in its guideway to determine the angle between this surface and the axis of rotation of the face plate, the tool 22 by means of the mechanism 23, may be caused to automatically move longitudinally of said structure $x$ and bore the interior thereof to the desired taper.

I claim:—

1. The combination in a taper boring machine of a crank; a boring bar having one end pivoted to said crank; a bearing having a spherically curved recess; a spherically curved member mounted in said recess and formed to support the opposite end of the boring bar while permitting its longitudinal movement therethrough; and means for turning the crank.

2. The combination in a taper boring machine of a crank; a bearing including an element having limited universal movement; means for turning the crank; a boring bar extending through the bearing and connected to the crank, said boring bar including a feed screw; mechanism for actuating said screw mounted on the end of the boring bar outside of said bearing; a tool holder actuated by said screw and movable longitudinally of the bar; and a tool carried by the holder.

3. The combination in a taper boring machine of a crank; means for turning said crank; a bearing including an element having a limited universal movement; a longitudinally slotted boring bar extending through said element of the bearing and having one end pivoted to the crank; feed mechanism mounted on the opposite end of said boring bar; a feed screw mounted on the boring bar; a tool holder actuated by the feed screw; and a tool carried by said holder.

4. The combination in a taper boring machine of a crank; means for turning said crank; a bearing including a spherically curved element supported to have a limited universal movement; a longitudinally slotted boring bar extending through the spherical element of said bearing and having one end pivoted to the crank; feed mechanism mounted on the opposite end of said boring bar; a feed screw mounted in the boring bar; a tool holder actuated by the feed screw; a tool carried by said holder; with means for varying the throw of the pivoted end of the boring bar.

HOWARD A. PEDRICK.